United States Patent [19]

Harlamert et al.

[11] Patent Number: 4,699,568
[45] Date of Patent: Oct. 13, 1987

[54] AIRCRAFT PROPELLER WITH IMPROVED SPINNER ASSEMBLY

[75] Inventors: W. Benjamin Harlamert; Donald C. Stackhouse, both of Piqua, Ohio

[73] Assignee: Hartzell Propeller Inc., Piqua, Ohio

[21] Appl. No.: 844,348

[22] Filed: Mar. 26, 1986

Related U.S. Application Data

[63] Continuation of Ser. No. 624,266, Jun. 25, 1984, abandoned.

[51] Int. Cl.⁴ .................... B64C 11/44; B64C 11/14
[52] U.S. Cl. ................................. 416/95; 416/155; 416/245 R
[58] Field of Search ............... 416/95, 245 R, 245 A, 416/246, 241 A, 155, 230 R; 244/130, 133, 134 D

[56] References Cited

U.S. PATENT DOCUMENTS

| | | | |
|---|---|---|---|
| 2,401,247 | 5/1946 | Hunter | 416/245 R |
| 3,115,937 | 12/1963 | Biermann | 416/46 |
| 3,380,535 | 4/1968 | Biermann | 416/46 |
| 3,455,396 | 7/1969 | Cummings | 416/95 |
| 3,575,529 | 4/1971 | Bierman | 416/27 |
| 3,578,526 | 5/1971 | Harding | 416/245 R |
| 3,664,764 | 5/1972 | Davies et al. | 416/224 |
| 4,097,189 | 6/1978 | Harlamert | 416/46 |
| 4,344,995 | 8/1982 | Hammer | 244/133 |
| 4,407,635 | 10/1983 | Grimes et al. | 416/230 |
| 4,419,053 | 12/1983 | Swearingen | 416/245 R |

FOREIGN PATENT DOCUMENTS

| | | | |
|---|---|---|---|
| 848267 | 10/1939 | France | 416/155 |
| 882261 | 5/1943 | France | 416/245 R |
| 556910 | 10/1943 | United Kingdom | 416/245 R |
| 572052 | 9/1945 | United Kingdom | 416/245 R |

Primary Examiner—Everette A. Powell, Jr.
Attorney, Agent, or Firm—Jacox & Meckstroth

[57] ABSTRACT

A propeller hub supports a plurality of adjustable pitch propeller blades which are rotated on corresponding radial axes by a hydraulic actuating system supported by the hub. The hub and pitch changing system are enclosed by a spinner assembly including a substantially flat circular bulkhead member having a core molded between skins of resin impregnated high modulus fiber material. The bulkhead member supports a spinner dome of molded resin impregnated high modulus fiber material, and concentric slip rings are supported by a member connected to the rearward face of the bulkhead member. Terminal posts extend from the slip rings through the bulkhead member to receive conductor wires for supplying electrical current to de-icing heating elements mounted on the blades. A fairing is bonded to the spinner dome for each blade to provide for optimum aerodynamic flow around the base portion of each blade, and each fairing is formed by a molded resin skin material covering a rigid foam core.

3 Claims, 6 Drawing Figures

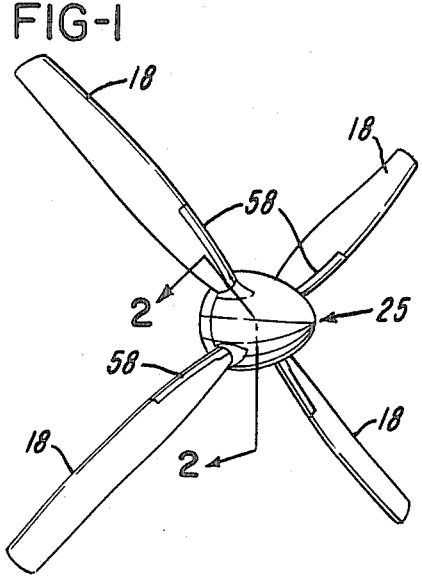
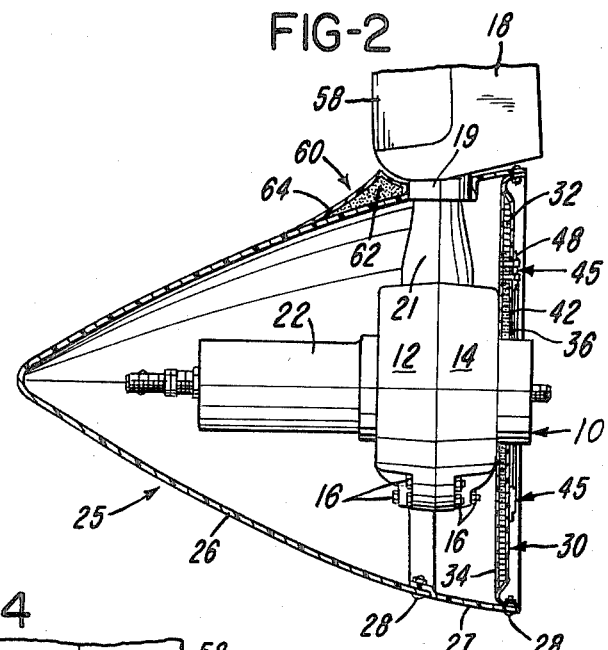
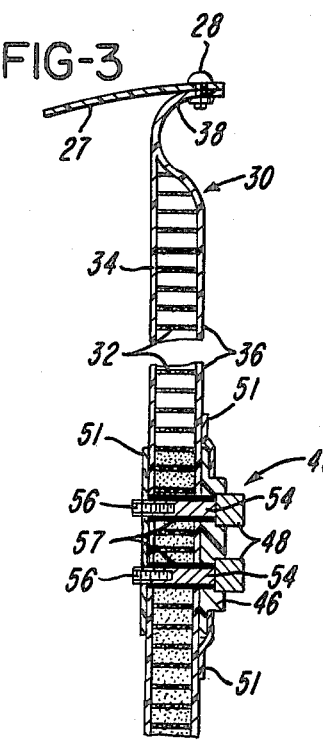
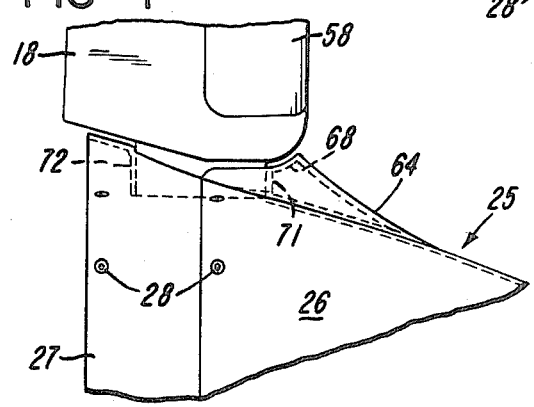
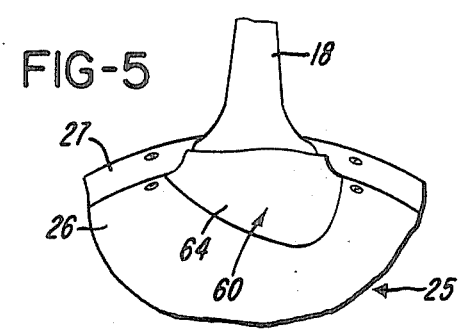
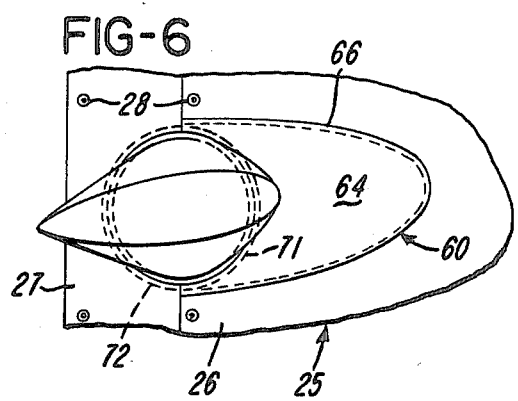

AIRCRAFT PROPELLER WITH IMPROVED SPINNER ASSEMBLY

This is a continuation of application Ser. No. 624,266, filed June 25, 1984, now anbandoned.

BACKGROUND OF THE INVENTION

The present invention relates to variable pitch aircraft propellers of the general type disclosed in U.S. Pat. No. 3,115,937, No. 3,380,535, No. 3,575,529, No. 4,097,189 and No. 4,407,635 assigned to the assignee of the present invention. These propellers usually incorporate a control mechanism for changing the pitch of the propeller blades between a feather position and a reverse position through high and low pitch positions. More specifically, the variable pitch aircraft propeller includes a hydraulic actuating cylinder assembly which mounts on and rotates with the hub of the propeller and receives hydraulic fluid from a governor unit driven by the aircraft engine. The governor unit preferably incorporates a positive displacement hydraulic pump which supplies hydraulic fluid through a governor control valve actuated by flyball weights responsive to the speed of the engine shaft. The governor control valve operates to maintain the engine speed substantially constant by precisely controlling the pitch of the propeller blades, but can be manually adjusted to change the blade pitch during flight.

As disclosed in above-mentioned U.S. Pat. No. 3,115,937, the hub assembly and hydraulic pitch changing cylinder assembly is commonly enclosed by a spinner assembly including an annular spinner bulkhead formed of aluminum sheet metal and mounted on the rearward portion of the hub. The bulkhead supports a dome-shaped cover or spinner dome which is removably secured to the bulkhead by peripherally spaced fasteners or screws. Usually, the dome of the spinner assembly is formed by spinning a circular sheet of aluminum. More recently, the spinner dome has been molded of high modulus fibers impregnated with epoxy resin and heat cured within a mold to provide a dome having substantial strength but significantly lighter than the aluminum sheet metal dome.

It is also common to provide the aircraft propeller assembly with a de-icing system. This system usually incorporates rubber covered electrical heating elements which are bonded by cement to the leading edge portions of the blades. Electrical power is supplied to the elements through a slip ring assembly including concentric copper rings retained within an annular insulating block for receiving corresponding carbon brushes. The block is recessed within an aluminum mounting ring which is secured by fasteners to the propeller hub adjacent the rear surface of the aluminum sheet metal bulkhead. Separate terminal blocks are mounted on the hub portions of the blades, and electrical wires extend from the copper rings through holes within the aluminum bulkhead for connecting the slip rings to the terminal blocks which also receive conductor wires extending from the heating elements. This slip ring assembly is relatively heavy and complex in construction and requires substantial time for assembly and servicing.

SUMMARY OF THE INVENTION

The present invention is directed to an aircraft propeller assembly including adjustable pitch propeller blades and incorporating an improved and simplified spinner assembly which substantially reduces the weight of the spinner assembly without reducing its strength. The spinner assembly is also adapted to incorporate a slip ring assembly of simplified construction and reduced weight and which is bonded directly to a spinner bulkhead member of composite plastics materials. The spinner assembly also incorporates a spinner fairing adjacent the base of each propeller blade to provide for a smooth flow of air around each blade with minimum drag.

In general, the above features and advantages are provided by a spinner assembly including a substantially flat bulkhead member having a honeycomb core between resin impregnated high modulus fiber skins. The outer peripheral edge portions of the skins are joined together and form a flange which supports a spinner dome also molded of resin impregnated high modulus fibers. An annular portion of the bulkhead has a core of high density rigid foam material, and an insulator ring is permanently bonded to or molded into the rearward skin of the bulkhead for supporting concentric copper slip rings for a de-icing system. Terminal posts extend from the slip rings through the bulkhead and receive wire conductors which extend to heating elements mounted on the propeller blades. Each spinner fairing includes a rigid foam core covered by a plastics resin skin which may be fiber reinforced. The skin is bonded to the spinner dome and then sanded and painted with the dome.

Other features and advantages of the invention will be apparent from the following description, the accompanying drawing and the appended claims.

BRIEF DESCRIPTION OF THE DRAWING

FIG. 1 is a perspective view of a four blade aircraft propeller assembly constructed in accordance with the invention;

FIG. 2 is an elevational view of the propeller hub and a portion of a propeller blade and showing the spinner assembly in axial cross section;

FIG. 3 is an enlarged fragmentary section of the spinner assembly shown in FIG. 2; and FIGS. 4–6 are fragmentary views of the blade and spinner assembly shown in FIG. 2 and illustrating a fairing attached to the spinner dome at the base of each propeller blade.

DESCRIPTION OF THE PREFERRED EMBODIMENT

The aircraft propeller assembly shown in FIGS. 1 and 2 includes a hub assembly 10 formed by a forward hub section 12 and a rearward hub section 14 which are clamped together by a series of peripherally spaced bolts 16. A plurality of angularly arranged propeller blades 18 project radially outwardly from the hub assembly 10, and each blade includes a cylindrical base portion 19 and a support portion or shank 21 which is retained by one or more anti-friction bearings (not shown) confined within the mating hub sections 12 and 14. The hub assembly 10 also supports a hydraulically actuated blade pitch changing mechanism including a cylinder assembly 22 for simultaneously changing the pitch of the blades 18 between a feather position and a reverse position through high and low pitch positions. The detail construction of the hub assembly 10 and the pitch changing mechanism is disclosed in above-mentioned U.S. Pat. No. 4,097,189 which is incorporated by reference. The detail construction of each blade 18 is disclosed in above-mentioned U.S. Pat. No. 4,407,635 which is also incorporated by reference.

In accordance with the present invention, the hub assembly 10 and the portions 19 and 21 of each propeller blade 18 and the blade pitch changing cylinder assembly 22 is enclosed within a spinner assembly 25 which includes a forward spinner dome section 26 and a rearward dome section 27 coupled together by threaded fasteners 28. Preferably, the spinner dome sections 26 and 27 are formed of high modulus fibers arranged in a mat which is impregnated with an epoxy resin. These materials are all pressurized within a heated mold to provide a high strength shell which has a weight approximately 60% lower than the weight of an aluminum spinner dome such as shown in above-mentioned U.S. Pat. No. 3,115,937.

The rearward peripheral edge portion of the spinner dome section 27 is attached by another set of peripherally spaced fasteners or screws 28 (FIG. 3) to an annular flat spinner bulkhead 30. As shown in FIGS. 2 and 3, the bulkhead 30 has a center hole for receiving the hub section 14 and is secured to the hub section by bolts (not shown). The bulkhead 30 includes a honeycomb core 32 formed by a fibrous-paper material sold by DuPont under the trademark NOMEX. The honeycomb core may be made of aluminum or other materials. The core 32 is sandwiched between a forward skin 34 and a rearward skin 36 of high modulus fiber material, such as carbon, aramid or glass fibers, impregnated with epoxy resin in the same manner as the spinner dome sections 26 and 27. The outer peripheral edge portions of the skins 34 and 36 are joined and molded together and form a peripheral flange 38 which receives the fasteners 28 for supporting the rearward spinner dome section 27.

An annular portion of the spinner bulkhead 30 incorporates a core portion 42 (FIG. 3) formed of a high density rigid polyurethane foam material. A slip ring assembly 45 (FIG. 3) is secured to or incorporated in the bulkhead 30 in the area of the rigid foam core 42 and includes an annular block or ring 46 of electrical insulating plastics material. The ring 46 supports a set of concentric copper slip rings 48 which are placed as inserts within the ring 46 when it is molded. The slip rings 48 are adapted to receive corresponding carbon brushes (not shown), and the insulating ring 46 is bonded to the rearward skin 36 of the bulkhead 30 by epoxy adhesive or resin and a layer 51 of resin impregnated fiber glass material. The insulating ring 46 may also be formed during the same layup and curing operations as the bulkhead 30.

A set of copper terminal posts 54 are welded to the slip rings 48 and project forwardly through corresponding holes within the spinner bulkhead 30 in the area of the rigid foam core 42. The forward end portions of the terminal posts 54 have threaded holes 56 for receiving terminal screws (not shown), and the posts 54 are potted within the bulkhead 30 by adhesive 57. The terminal screws connect the inner ends of flexible electrical conducting wires (not shown) to the terminal posts 54. The outer ends of the wires are connected to de-icing heating elements 58 which are bonded to the leading edges of the propeller blades 18. One source for the de-icing heating elements 58 is The B. F. Goodrich Company which markets the heating elements under the trademark HOT-PROP.

The spinner assembly 25 also includes a spinner fairing 60 for each of the propeller blades 18 to provide for smooth aerodynamic flow of air around the inner portion of each propeller blade. Each of the fairings 60 includes a core 62 of rigid polyurethane foam and shaped to fit or mount on the curved outer surface of the spinner dome section 26. The foam core 62 is covered or enclosed by a vacuum formed plastics resin skin 64 which may be fiber reinforced and is contoured to the desired curvature according to the shape of the inner portion of the propeller blade 18 to provide the smoothest air flow. Each spinner fairing 60 is bonded to the forward spinner dome section 26 by epoxy cement, and the outer edge portion 66 of the skin 64 is sanded and painted with the same paint as applied to the spinner dome so that the fairings 60 appear to be integral portions of the spinner dome section 26.

The skin 64 of each fairing 60 also has a curved surface 68 which is a surface of revolution corresponding to the path of the adjacent inner end surface of the propeller blade 18 when the pitch of the blade is changed by rotation of the blade on its radial axis. As shown in FIGS. 4 and 6, the forward and rearward sections of the spinner dome have mating semi-cylindrical portions 71 and 72, respectively, which define a cylindrical opening for receiving the base portion 19 of each propeller blade 18. The mating semi-cylindrical portions 71 and 72 closely surrounding the cylindrical base portion 19 of each propeller blade 18 and cooperate with the curved outer surface of the corresponding spinner fairing 60 to provide for a smooth non-turbulent flow of air around the inner portion of each propeller blade and thereby minimize the drag forces on the spinner assembly 25.

As mentioned above, the basic flat construction of the spinner bulkhead 30 provides for simplified construction of the bulkhead with the resin impregnated skins 34 and 36 separated by the cores 32 and 42. The basic flat construction of the bulkhead 30 also simplifies the construction and incorporation of the de-icing slip ring assembly 45 in order to minimize the weight of the bulkhead 30 and slip ring assembly 45 without any decrease in the strength of the bulkhead 30. The assembly of the terminal posts 54 through the bulkhead 30 also simplifies the installation of the slip ring assembly as well as simplifying the connection of the wire conductors extending from the de-icing heating elements 58 to the terminal posts 54. It is also apparent that the construction of the spinner bulkhead 30 and slip ring assembly 45 minimizes the machining of the components and provides for relatively quick assembly of the components.

While the propeller assembly herein described constitutes a preferred embodiment of the invention, it is to be understood that the invention is not limited to the precise assembly described, and that changes may be made therein without departing from the scope and spirit of the invention as defined in the appended claims.

The invention having thus been described, the following is claimed:

1. An aircraft propeller assembly comprising a propeller hub adapted to be driven by an engine, a plurality of angularly disposed adjustable pitch propeller blades supported by said hub, pitch changing means for changing the pitch of said blades, a spinner assembly enclosing said hub and said pitch changing means and including a generally circular and radially disposed bulkhead member connected to said hub, a dome member mounted on said bulkhead member and covering said hub, said bulkhead member including a core of spacer material disposed between spaced first and second substantially flat skins of fiber reinforced resin material, said skins having corresponding outer peripheral edge portions connected to each other and to said dome member, an electrically operated de-icing element mounted on each of said propeller blades, electrical conductor means supported by said hub for supplying electrical power to said de-icing elements while said propeller hub and blades are rotating, said conductor means including a set of electrical conducting slip rings disposed in concentric relation, a body of fiber reinforced resin material bonded to said slip rings, a layer of adhesive bonding said body to said first skin, a corresponding set of electrical conducting terminal posts extending through said skins and said core and connected to the corresponding said slip rings within said body of fiber reinforced resin material, and an annular sheet of fiber reinforced resin material overlaying said body and said first skin and bonded thereto to form a positive attachment of said body to said first skin.

2. An aircraft propeller assembly as defined in claim 1 wherein said core has an inner annular portion having a higher density than the density of a surrounding portion of said core, and said terminal posts extend through said annular portion.

3. An aircraft propeller assembly as defined in claim 1 wherein said dome member comprises an annular rearward section and a separate generally conical forward section each formed of a fiber reinforced resin material, means for releasably connecting said forward section to said rearward section, said forward and rearward sections of said dome member cooperating to define openings for said blades, a spinner fairing mounted on said forward section of said dome member adjacent each of said blades, each of said spinner fairings including a skin of fiber reinforced resin material bonded to said outer surface of said forward section of said dome member, and said spinner fairings being removable with said forward section from said rearward section.

* * * * *